United States Patent
Cocchini et al.

(10) Patent No.: US 7,891,216 B2
(45) Date of Patent: Feb. 22, 2011

(54) METHOD FOR PRODUCING AN OPTICAL FIBER HAVING LOW POLARIZATION MODE DISPERSION

(75) Inventors: Franco Cocchini, Cava dei Tirreni (IT); Andrea Mazzotti, Rende (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1073 days.

(21) Appl. No.: 10/541,031

(22) PCT Filed: Dec. 30, 2002

(86) PCT No.: PCT/EP02/14901
§ 371 (c)(1), (2), (4) Date: Apr. 24, 2006

(87) PCT Pub. No.: WO2004/058654
PCT Pub. Date: Jul. 15, 2004

(65) Prior Publication Data
US 2006/0230791 A1    Oct. 19, 2006

(51) Int. Cl.
    C03B 37/00    (2006.01)
(52) U.S. Cl. .............................. 65/402; 65/377; 65/381
(58) Field of Classification Search .................. 65/377, 65/402, 381
    See application file for complete search history.

(56) References Cited

U.S. PATENT DOCUMENTS

| | | | |
|---|---|---|---|
| 5,298,047 A | | 3/1994 | Hart, Jr. et al. |
| 5,822,487 A | * | 10/1998 | Evans et al. .................. 385/123 |
| 6,189,343 B1 | | 2/2001 | Cocchini et al. |
| 6,240,748 B1 | | 6/2001 | Henderson et al. |
| 6,324,872 B1 | * | 12/2001 | Blaszyk et al. ................ 65/504 |
| 2001/0046358 A1 | | 11/2001 | Sasaoka et al. |
| 2003/0086670 A1 | * | 5/2003 | Moridaira et al. ........... 385/123 |
| 2004/0017986 A1 | * | 1/2004 | Garner et al. ............... 385/123 |

FOREIGN PATENT DOCUMENTS

| | | |
|---|---|---|
| EP | 0 582 405 A1 | 2/1994 |
| EP | 0 729 919 A2 | 9/1996 |
| EP | 1 325 894 A2 | 7/2003 |
| WO | WO 01/33184 A1 | 5/2001 |

OTHER PUBLICATIONS

Cocchini, F. et al., "On-Line Fiber Spinning Monitoring for Low PMD Optical Fibers," International Wire & Cable Symposium, Proceedings of the 49th, pp. 49-54, (2000).

Galtarossa, A. et al., "Optimized Spinning Design for Low PMD Fibers: An Analytical Approach," Journal of Lightwave Technology, vol. 19, No. 10, pp. 1502-1512, (Oct. 2001).

* cited by examiner

Primary Examiner—Queenie Dehghan
(74) Attorney, Agent, or Firm—Finnegan, Henderson, Farabow, Garrett & Dunner, L.L.P.

(57) ABSTRACT

A method for producing an optical fiber having low polarization mode dispersion, by the steps of a) providing an optical fiber perform of glass material; b) heating the glass material of an end portion of the optical fiber perform; c) drawing the heated glass material at a drawing speed V to form an optical fiber, the drawn glass material having a viscous zone; and d) applying to the optical fiber a substantially sinusoidal spin, which is transmitted to the viscous zone, the spin function frequency v, the viscous zone length L and the drawing speed V being such that both a torsion and at least a 50% detorsion are applied to the viscous zone.

7 Claims, 4 Drawing Sheets

METHOD FOR PRODUCING AN OPTICAL FIBER HAVING LOW POLARIZATION MODE DISPERSION

CROSS REFERENCE TO RELATED APPLICATION

This application is a national phase application based on PCT/EP2002/014901, filed Dec. 30, 2002, the content of which is incorporated herein by reference.

BACKGROUND OF THE INVENTION

1. Field of the Invention

The present invention relates to a method for producing an optical fiber having low polarization mode dispersion.

2. Description of the Related Art

Optical signals transmitted through single-mode optical fibers comprise two orthogonal polarization modes that, in case of a fiber with a perfectly cylindrical core of uniform diameter, propagate at a common velocity. However, in real optical fibers the core cylindrical symmetry may be disrupted due to shape defects or non-uniform stresses. As a result, a phase difference can accumulate between the two modes, and the fiber is said to show "birefringence". In particular, the birefringence introduced by shape and internal stress asymmetry is known as "intrinsic linear birefringence".

The structural and geometrical irregularities of the optical fiber that give rise to birefringence typically originate from the preform itself and are modified during the process of drawing the fiber. This drawing process is usually carried out by means of an apparatus known as a "drawing tower", starting from a glass preform. In practice, after the preform has been placed in a vertical position and heated to a temperature above the softening point within a suitable furnace, the molten material is drawn downwards at a controlled speed in such a way as to produce a threadlike element that forms the optical fiber itself. In this process, asymmetrical stresses are typically introduced in the fiber.

In a birefringent fiber, the two components of the fundamental mode, initially in phase with each other, come to be in phase again only after a certain length, commonly known as the "beat length". In other words, the beat length is the period of repetition of a certain state of polarization (on the assumption that the fiber maintains a constant birefringence over this length).

In the so-called "polarization-preserving fibers", asymmetry is deliberately introduced into the fiber to generate birefringence. However, in ordinary (i.e. non-polarization-preserving) fibers, birefringence is detrimental. In fact, when pulsed signals are transmitted into an optical fiber, the birefringence is a potential cause of pulse spreading, since the two polarization components excited by the pulses travel at different group velocities (i.e. become dispersed). This phenomenon, known as polarization mode dispersion (PMD), has been widely studied in recent years because of its importance in periodically amplified light guide systems.

Typically, the phenomenon of PMD leads to a limitation of the width of the signal transmission band and, consequently, a degradation of the performance of the optical fibers along which the aforesaid signals are transmitted. This phenomenon is therefore undesirable in systems of signal transmission along optical fibers, especially in those operating over long distances, in which it is necessary to minimize any form of attenuation or dispersion of the signals to guarantee high performances in transmission and reception.

In order to reduce the polarization mode dispersion in an optical fiber it has been proposed to spin the fiber during the drawing process so that the fiber is caused to twist around its longitudinal axis, with a resulting torsional deformation of the viscous zone of the fiber material in the furnace; this deformation is frozen into the fiber as the fiber looses its viscous status by cooling.

Due to spinning, a rotation of the polarisation axes of the fiber is impressed on (and frozen into) the fiber. As a result, when the optical pulses are transmitted into the optical fiber, they propagate alternately on the slow and fast birefringence axes, thus compensating the relative delay and reducing the pulse spreading. This is equivalent to have a local effective refractive index for the pulses equal to the mean refractive index on the two axes, the average being taken over the pulse length along the fiber.

In the present description and claims
- with "applied spin" or "applied torsion" it is intended the torsion applied to the fiber during the drawing process by a spinning apparatus so that the fiber is caused to rotate around its longitudinal axis;
- with "actually applied spin" or "actually applied torsion" it is intended the torsion effectively applied to the fiber during the drawing process notwithstanding possible mechanical effects, e.g., slippage, at the interface between the fiber and the spinning apparatus;
- with "viscous zone" is intended a longitudinal portion of the glass material of the optical fiber that in the furnace has a temperature sufficiently high to be in a viscous status;
- with "viscous zone length" is intended the length of said longitudinal portion in a viscous status, which substantially corresponds to the length of the portion of the furnace comprised between its hottest point and its exit point; for example, in a furnace comprising an upper muffle, a core muffle defining a hot zone, and a lower muffle, the viscous zone length may be approximated with the length of the portion of the furnace comprised between the central part of the hot zone and the lower end of the lower muffle;
- with "frozen-in spin" or "frozen-in torsion" it is intended the torsion permanently impressed on the fiber, when cooled, during the spinning process as a result of the torsional deformation undergone by the viscous zone of the fiber material in the furnace;
- with "maximum applied spin" or "maximum applied torsion" is intended the maximum value of the applied torsion;
- with "maximum frozen-in spin" or "maximum frozen-in torsion" is intended the maximum value of the frozen-in torsion;
- with "detorsion" is intended a torsion having a direction opposite to the direction of a previous torsion;
- with "at least a 50% detorsion" is intended a detorsion adapted to impart an angular displacement equal to at least half the angular displacement imparted by the previous torsion;
- with "recovery" is intended the ratio $(T_{appl}-T_{fr})/T_{appl}$, wherein $T_{appl}$ is the maximum actually applied torsion and $T_{fr}$ is the maximum frozen-in torsion;
- with "substantially sinusoidal spin" is intended, as disclosed by the document U.S. Pat. No. 6,240,748, a spin function wherein the magnitude of the coefficient for one of its oscillatory components (the fundamental component) dominates the magnitude of the coefficients for all other oscillatory components (the secondary components) as well as the coefficient for any constant component. In quantitative terms, domination occurs when the magnitude of the coefficient for the fundamental component is at least about three times the magnitude of the coefficient for each of the secondary components and the coefficient of the constant component. The magnitude of said coefficients can be determined by performing a complex Fourier analysis of the spin function using conventional techniques well known in the art.

U.S. Pat. No. 5,298,047 discloses that PMD can be substantially reduced if, during drawing of the fiber, a torsion is applied to the fiber such that a permanent spin (i.e., a permanent torsional deformation) is impressed on the fiber. The torsion is applied such that the spin impressed on the fiber has alternately clockwise and counterclockwise helicity. This document states that fibers having impressed spin lower than 4 spins/meter do not exhibit commercially significant reduction in PMD. Thus, it teaches to apply a torsion to the fiber such that the spin impressed on (frozen into) the fiber is, in at least a portion thereof, in excess of 4 spins/meter, preferably in excess of 10 or even 20 spins/meter.

U.S. Pat. No. 6,240,748 states that a conventional sinusoidal spin function, as that disclosed by the above mentioned U.S. Pat. No. 5,298,047 document, is capable of reducing PMD only for a small number of fiber beat lengths. For example, U.S. Pat. No. 6,240,748 shows that a conventional sinusoidal spin function having a spin amplitude of 3 turns/meter and a spatial frequency f of 2 meter$^{-1}$, while obtaining a low PMD reduction factor at a beat length of approximately a quarter of a meter, does not maintain this PMD reduction for longer beat lengths. Therefore, U.S. Pat. No. 6,240,748 teaches to reduce PMD in single mode optical fiber by spinning the fiber during the drawing process in accordance with a spin function having sufficient harmonic content to achieve low level of PMD for commercial fibers for which the beat lengths of the fibers, including the beat lengths of different portions of the fibers, are variable and thus not readily known in advance. Examples of suitable spin functions capable of achieving low levels of PMD for a variety of beat lengths include frequency-modulated and amplitude-modulated sine waves. However, the Applicant notes that the spin functions disclosed by this latter document require the use of a complex and expensive spinning apparatus.

Moreover, U.S. Pat. No 6,240,748 states that the spin function employed in producing a fiber and the resulting (frozen-in) spin function present in the finished fiber are not in general identical because of mechanical effects, e.g., slippage, at the interface between the fiber and the apparatus used to apply the spin function to the fiber. However, it states that the correspondence between the spin function applied by the spinning apparatus and the resulting spin function in the fiber is in general good enough to achieve the benefits of the invention disclosed therein.

SUMMARY OF THE INVENTION

On the contrary, the Applicant has found a new technique for producing a low PMD fiber wherein there is a substantial difference between the applied spin function and the "frozen-in" spin function, even in the absence of said mechanical effects. According to this technique, a torsion and at least a 50% detorsion are applied to the viscous zone of the fiber material while the fiber material passes through the furnace.

The Applicant has found that when both a torsion and at least a 50% detorsion are applied to the viscous zone of the fiber material, a significant PMD reduction is achieved even if the amplitude of the frozen-in spin function is much lower than the amplitude of the actually applied spin function. More in particular, contrary to the teaching of the above-mentioned U.S. Pat. No. 5,298,047 document, the Applicant has found that in these conditions a significant PMD reduction is achieved even when the maximum frozen-in spin is lower than 4 turns/meter. In fact, the Applicant has noted that it is sufficient that the maximum actually applied spin is higher than 4 turns/meter.

Without intending to be bound to any theory, the Applicant believes that, when such combination of torsion and at least 50% detorsion is applied, a significant PMD reduction is achieved—notwithstanding the frozen-in spin is much lower than the applied spin—due to the fact that the viscous torsion, undergone in the furnace by each portion of fiber material, significantly affects the geometrical asymmetries of the optical fiber and, thus, the local birefringence intensity (i.e., the local beat length) thereof. The Applicant believes that the viscous torsion produces a spread of the birefringence intensity along the optical fiber so that different portions of spun optical fiber have different beat length values. Such beat length variation along the spun optical fiber, with respect to unspun fiber, greatly increase—even in the case of a simple sinusoidal spin function—the mixing between the two orthogonal polarization modes, turning out in a PMD reduction. Thus, the Applicant believes that the viscous torsion affects the beat lengths along the fiber so that a PMD reduction is achieved also in fibers having (as unspun) a great number of beat lengths, even in the case of a simple sinusoidal spin function.

Accordingly, the Applicant believes that, when a torsion and at least a 50% detorsion are applied to the fiber in its viscous status, the PMD is reduced mainly thanks to the above mentioned effects of the viscous torsion and only in part because of the effect of the frozen-in spin.

In a first aspect the present invention relates to a method for producing an optical fiber having low polarization mode dispersion, comprising the steps of a) providing an optical fiber preform of glass material;

b) heating the glass material of an end portion of the optical fiber preform;

c) drawing the heated glass material at a drawing speed V to form an optical fiber, the drawn glass material having a viscous zone;

d) applying to the optical fiber a substantially sinusoidal spin, which is transmitted to the viscous zone;

characterized in that the spin function frequency ν, the viscous zone length L and the drawing speed V are such that both a torsion and at least a 50% detorsion are applied to the viscous zone.

For the purposes of the present invention, the condition "torsion and at least a 50% detorsion applied to the viscous zone" includes both the condition wherein a single torsion and a single detorsion of at least 50% are applied to the viscous zone, and the condition wherein a higher number of torsions and detorsions are applied to the viscous zone, provided that the last detorsion is of at least 50%.

Furthermore, said condition corresponds to the condition of selecting the spin function frequency ν, the viscous zone length L and the drawing speed V so as to achieve a recovery R of at least 0.5.

The dependent claims relate to particular embodiments of the invention.

Preferably, the spin function frequency ν, the viscous zone length L and the drawing speed V are such that both a torsion and at least a 60% detorsion are applied to the viscous zone. This condition corresponds to the condition that the spin function frequency ν, the viscous zone length L and the drawing speed V are such as to achieve a recovery R of at least 0.6.

The Applicant believes that with a recovery of at least 50% (preferably, of at least 60%) the effect of the viscous torsion on the PMD reduction override the effect of the frozen-in torsion. Moreover, the Applicant believes that a recovery of at least 50% (preferably, of at least 60%) allows the PMD to be significantly reduced even if the frozen-in spin is much lower than the applied spin.

Advantageously, the spin function frequency ν, the viscous zone length L and the drawing speed V are such that $1.2*L \leq V/\nu \leq 6.7*L$. The Applicant found that this allows a recovery of at least 50% to be achieved. Preferably, $1.7*L \leq V/\nu \leq 3.3*L$. The Applicant found that this allows a recovery of at least 60% to be achieved.

Advantageously, the spin function frequency ν, the spin function amplitude $\theta_0$ and the drawing speed V are such that the maximum applied torsion is at least of 4 turns/meter. Advantageously, the spin function frequency ν, the spin function amplitude $\theta_0$ and the drawing speed V are such that the maximum frozen-in torsion is no more than 4 turns/meter.

Advantageously, the spin function amplitudes $\theta_0$ (in turns) is such that $(2V)/(\nu\pi) \leq \theta_0 \leq (2V)/[\nu\pi(1-R)]$, wherein R is the recovery, V the drawing speed (in meter/second) and ν is the spin function frequency (in Hz). This makes the maximum applied torsion to be at least of 4 turns/meter and the maximum frozen-in torsion to be no more than 4 turns/meter.

BRIEF DESCRIPTION OF THE DRAWINGS

Characteristics and advantages of the invention shall now be illustrated with reference to embodiments represented as a non-limiting example in the attached drawings in which.

DETAILED DESCRIPTION OF THE INVENTION

Figure 1:
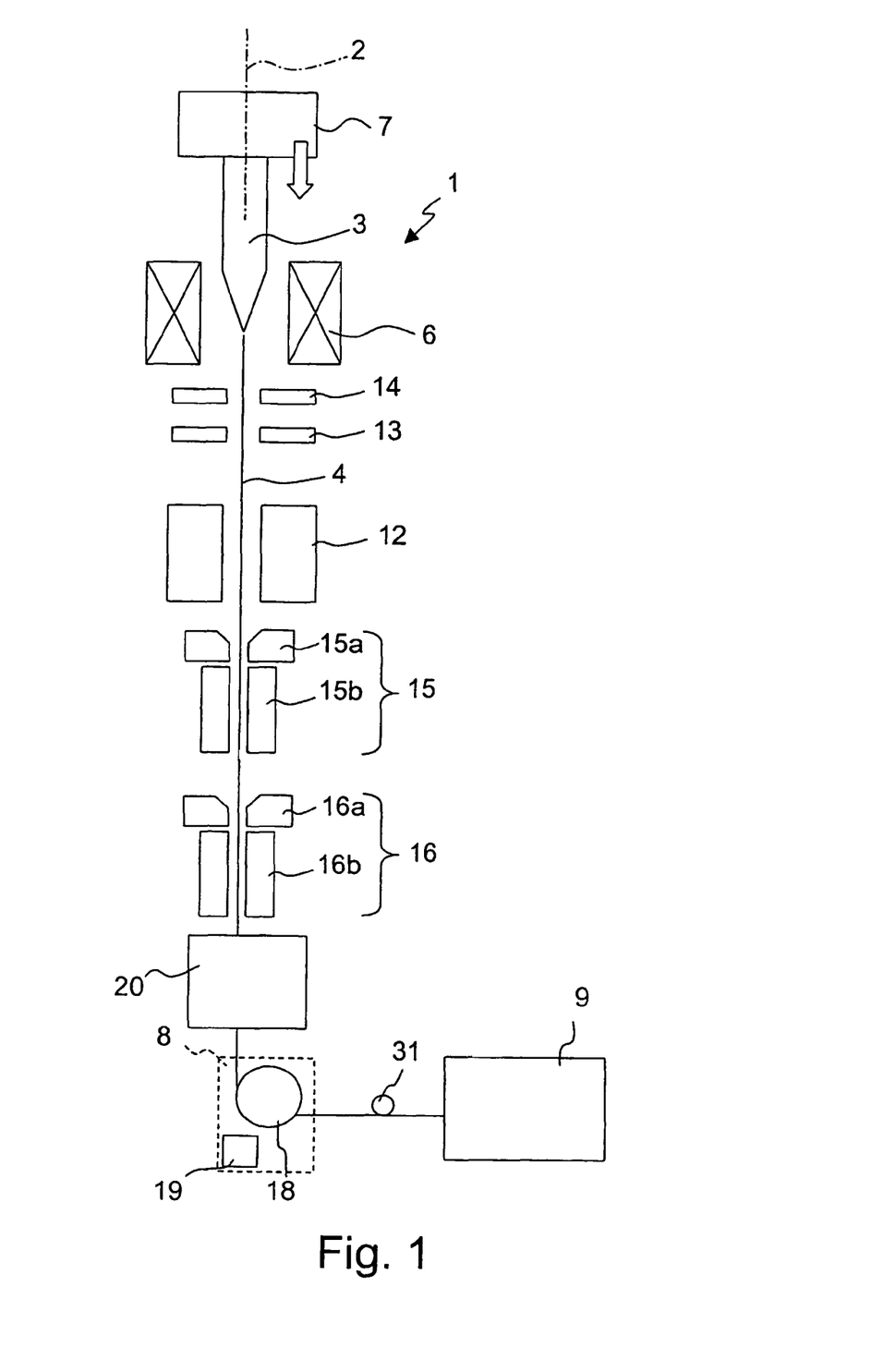
FIG. 1 shows a drawing tower that can be used in the method of the present invention.

With reference to FIG. 1, a drawing tower 1 comprises a plurality of devices that are substantially aligned in a vertical drawing axis 2 (whence the term "tower").

In detail, the tower 1 comprises a furnace 6 for performing a controlled melting of a lower end portion of a preform 3 (also known as preform neckdown), a feeding device 7 for supporting the preform 3 and feeding it into the furnace 6 from the above, a traction device 8 (at a lower end of the tower) for pulling the fiber 4 from the preform 3 and a winding device 9 for storing the fiber 4 onto a reel (not shown).

Typically, the fiber material of the glass preform 3 comprises $SiO_2$ and $GeO2$.

The furnace 6 may be of any conventional type designed to produce a controlled melting of the preform. Furnace 6 may for example comprise (as better described in the following) an upper muffle, a core muffle provided with a heating coil and defining a hot zone of the furnace 6, and a lower muffle.

Preferably, a cooling device 12, for example of a type having a cooling cavity designed to be passed through by a flow of cooling gas, is situated underneath the furnace 6 for cooling the fiber 4 leaving it. The cooling device 12 is arranged coaxial to axis 2, so that the fiber 4 leaving the furnace 6 can pass through it.

Tower 1 may also be provided with a tension-monitoring device 13 (for example of the type described in U.S. Pat. No. 5,316,562) and a diameter detector 14 of a known type, preferably positioned between the furnace 6 and the cooling device 12, for measuring the tension and the diameter of the fiber 4, respectively.

Preferably, the drawing tower 1 further comprises a first and a second coating device 15, 16 of a known type, positioned underneath the cooling device 12 in the vertical drawing direction and designed to deposit onto the fiber 4, as it passes through, a first protective coating and, respectively, a second protective coating. Each coating device 15, 16 comprises, in particular, a respective application unit 15a, 16a which is designed to apply onto fiber 4 a predefined quantity of resin, and a respective curing unit 15b, 16b, for example a UV-lamp oven, for curing the resin, thus providing a stable coating.

The traction device 8 may be of the single pulley or double pulley type. In the illustrated embodiment, the traction device 8 comprises a single motor-driven pulley (or "capstan") 18 that is designed to draw the fiber 4, already coated, in the vertical drawing direction. The traction device 8 may be provided with an angular velocity sensor 19 that is designed to generate a signal indicating the angular velocity of the pulley 18 during its operation. The speed of rotation of the pulley 18 and, therefore, the drawing speed V of the fiber 4, may be varied during the process, for example as a response to a diameter variation detected by detector 14.

One or more pulleys 31 (or guiding members of other types) are advantageously provided for guiding the fiber 4 from the traction device 8 to the winding device 9.

In addition, a tension control device (not shown), such as a "dancer", may be provided for regulating the tension of the fiber during winding.

The winding device 9 is of a known type.

The drawing tower 1 may further comprise a control unit (not shown), electrically connected to all the devices, sensors and detectors present along the tower 1 to be controlled from the outside.

Lastly, the drawing tower 1 further comprises a spinning apparatus 20, positioned between coating devices 15, 16 and traction device 8, for imparting a spin to the fiber 4 about its longitudinal axis during drawing.

According to the method of the invention, the spinning apparatus 20 is adapted to impart a substantially sinusoidal spin to the fiber. An example of spinning apparatus that can be used in the method of the invention is described in U.S. Pat. No. 6,324,872.

Alternatively, the spinning apparatus may be integrated in one of the coating devices 15, 16 (preferably in the first coating device 15) as described in U.S. Pat. No. 6,189,343.

The drawing tower 1 operates as follows.

The supporting device 7 feeds the preform 3 to the furnace 6, where a lower portion thereof (the neckdown) is melted. The fiber 4 drawn from the neckdown is pulled down from the traction device 8 and wound onto a reel by the winding device 9.

As the fiber 4 is drawn, sensors 13 and 14 monitor its tension and diameter. Such monitoring can be used to control the drawing process, for example by operating on the drawing speed. When exiting the furnace 6, the fiber 4 is cooled by the cooling device 12 and is coated with two protective layers by coating devices 15, 16.

During drawing, the spinning apparatus 20 applies to the fiber a substantially sinusoidal spin. This substantially sinusoidal spin can be described by the following spin function:

$$\theta = \theta_0 \cos(2\pi \nu t) \tag{1}$$

wherein $\nu$ is the spin function frequency measured in hertz, t is the time measured in seconds and $\theta_0$ is the spin function amplitude measured in turns which denotes the angle of rotation of the optical fiber measured with respect to a fixed reference point.

The angular speed at the spinning apparatus 20 is described by the time derivative of equation (1), that is by $d\theta/dt$. Therefore, the maximum angular speed of the fiber at the spinning apparatus 20 is $$\Omega = 2\pi \nu \theta_0 \tag{2}$$

The maximum applied spin T is measured in turns/m and is described by the ratio between the maximum angular speed and the drawing speed V:

$$T = \Omega/V = 2\pi \nu \theta_0 / V \tag{3}.$$

According to the invention, the spin function frequency $\nu$, the viscous zone length L of the fiber and the drawing speed V are such that each optical fiber portion—while being in the viscous state in the furnace 6—undergoes first a torsion and then at least a 50% detorsion.

Furthermore, the spin function frequency $\nu$, the spin function amplitude $\theta_0$ and the drawing speed V are preferably such that the maximum applied torsion (see equation 3) is at least of 4 turns/meter. Moreover, the spin function frequency $\nu$, the spin function amplitude $\theta_0$ and the drawing speed V are advantageously such that the maximum frozen-in torsion is no more than 4 turns/meter. That is, the following relationship is advantageously met: $(2V)/(\nu\pi) \leq \theta_0 \leq (2V)/[\nu\pi(1-R)]$, wherein R is the recovery (defined above in the description).

Typically, the drawing speed V is at least of 5 m/s. Typically, the drawing speed V is no more than 20 m/s. Typically, the drawing tension is at least of 40 gr. Typically, the drawing tension is no more than 400 gr. Typically, the viscous zone length L is at least of 0.3 m. Typically, the viscous zone length L is no more than 2 m. Typically, the frequency $\nu$ is at least of 1. Typically, the frequency $\nu$ is no more than 10 Hz. Typically, the spin function amplitude $\theta_0$ is at least of 2 turns. Typically, the spin function amplitude $\theta_0$ is no more than 10 turns.

When spun, the fiber 4 transmits a corresponding torsion upstream and downstream. Upstream, the torsion is transmitted to the preform neckdown so that the fiber glass material, which is in the viscous state in the furnace 6, undergoes a viscous torsional deformation. As previously stated, according to the method of the invention, each portion of fiber glass material—while being in the viscous state in the furnace 6—undergoes both a torsion and at least a 50% detorsion. The torsional deformation resulting from the torsion and the at least 50% detorsion is then frozen into each corresponding portion of the optical fiber 4 as the fiber cools. On the other hand, downstream, the torsion is elastically transmitted to the wound fiber 4. However, thanks to the substantially sinusoidal spin function, that alternately imparts a clockwise and counterclockwise torsion to the fiber, the wound fiber 4 is substantially free of torsional elastic strain.

The Applicant has found that, when both a torsion and at least a 50% detorsion are applied to each optical fiber portion while being in the viscous state in the drawing tower 1, the frozen-in spin is much lower than the actually applied spin and that, in spite of that, a significant PMD reduction is achieved.

Figure 2:
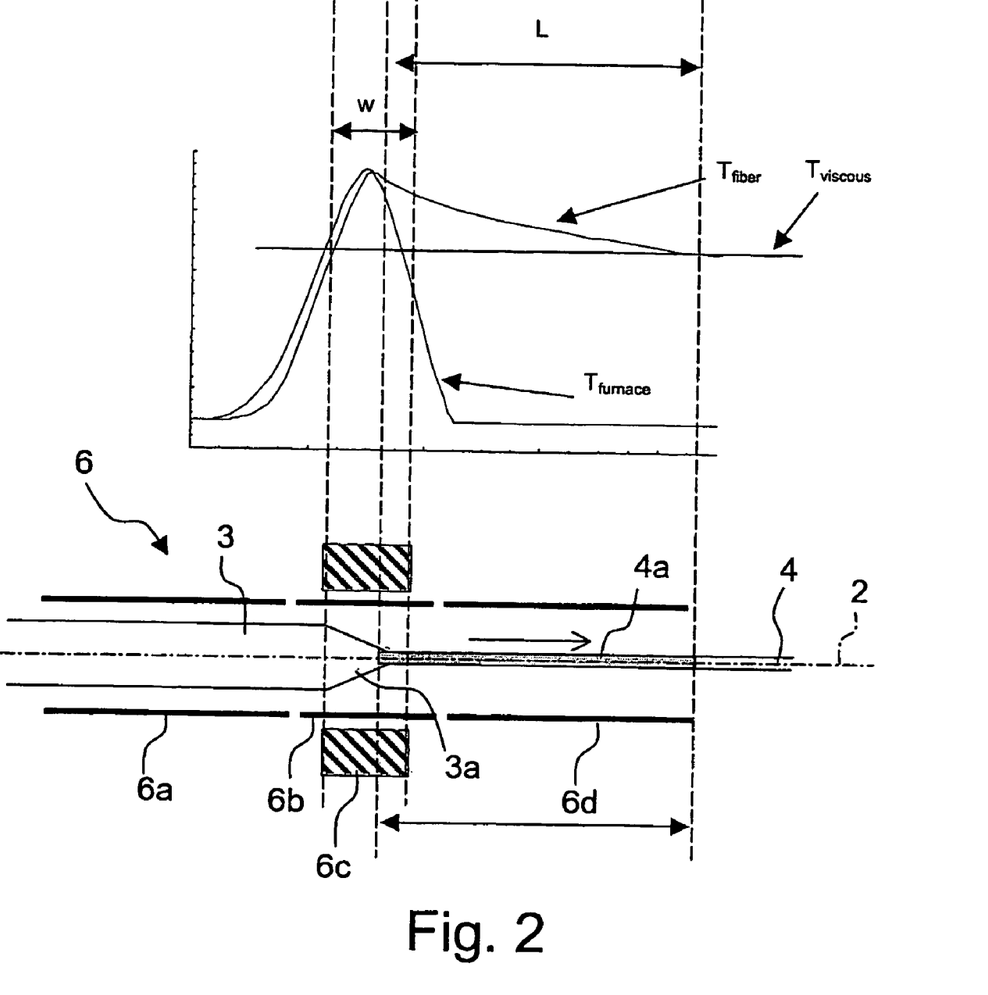
FIG. 2 is a schematic (and not in scale) representation of the process of formation of an optical fiber from an optical preform inside a furnace, which is part of the drawing tower of FIG. 1.

FIG. 2 shows schematically, in a horizontal orientation for convenience, the furnace 6, the optical fiber 4 as it is drawn from the preform neckdown, indicated with 3a, and the temperature profiles (along axis 2) inside the furnace 6 and of the fiber 4. An arrow shows the advancing direction (from left to right) of the fiber 4.

In the disclosed embodiment, the furnace 6 comprises an upper muffle 6a, a central muffle 6b surrounded by a heating coil 6c, and a lower muffle 6d. The temperature diagram shows the temperature profile of the furnace internal walls, indicated with $T_{furnace}$. The region of the central muffle 6b surrounded by the heating coil 6c defines a hot zone of the furnace 6, whose length is indicated with w. Inside the hot zone, the temperature $T_{furnace}$ has a peak and the material of the neckdown 3a melts, thus allowing drawing thereof.

The fiber 4 has, as it is formed inside the furnace 6, a viscous zone 4a (represented in grey colour), i.e. a longitudinal portion wherein the temperature is so high that the glass material is in a viscous status. In particular, in the viscous zone 4a the temperature of the fiber 4, indicated with $T_{fiber}$, is higher than a viscous threshold temperature $T_{viscous}$ (represented by a horizontal line in the temperature diagram). It can be appreciated that the temperature profile of the fiber 4 has a peak in the hot zone of the furnace 6 and progressively decreases in the lower muffle 6d. The viscous zone 4a of the fiber 4 extends substantially from a point at the lower end of the neckdown 3a wherein the melting material has a diameter that is insufficient for resisting, without deforming, to the typical spinning forces (this diameter, not shown for the sake of clarity in FIG. 2, being about twice the diameter of the final fiber) to a point of the fiber 4 wherein the temperature $T_{fiber}$ becomes lower than the viscous threshold temperature $T_{viscous}$. Over this last point, the temperature of the fiber 4 is below the viscous threshold temperature $T_{viscous}$ and the viscosity of the fiber 4 is so high that viscous torsion is no more allowed.

The Applicant has verified that the length of the viscous zone 4a, indicated with L in FIG. 2, is typically slightly lower than the distance between the centre of the hot zone of the furnace 6 and the exit point of the furnace 6, which in this case corresponds to the lower end of the lower muffle 6d. For the sake of simplicity, the viscous zone length L may be well approximated with that distance.

In the case of a conventional silica glass fiber material, the temperature $T_{furnace}$ in the hot zone of the furnace 6 is typically at least of about 1800° C. Typically, said temperature $T_{furnace}$ is no more than 2200° C. Furthermore, the viscous threshold temperature $T_{viscous}$ is typically at least of 1600° C.

EXAMPLES

In a first experiment, the Applicant drew a glass preform by using a drawing tower like that shown in FIG. 1.

A silica preform with the core portion doped with germanium was used.

The temperature used for heating the neckdown preform was 1800° C., the drawing tension was about 300 gr, the spin function amplitude θ₀ was about 5 turns, the drawing speed V was 2 m/s and the spin function frequency ν was set to various values ranging from 0.25 to 1.75 Hz. The length L of the viscous zone of the fiber is approximated with the distance between the centre of the hot zone of the furnace 6 and the lower end of the lower muffle 6d, which was 1 m in this case.

The preform was imprinted with a longitudinal groove so as to have a visual reference for the angular rotation of the glass and to allow the spin frozen into the drawn fiber to be easily detected at the microscope.

Figure 3:
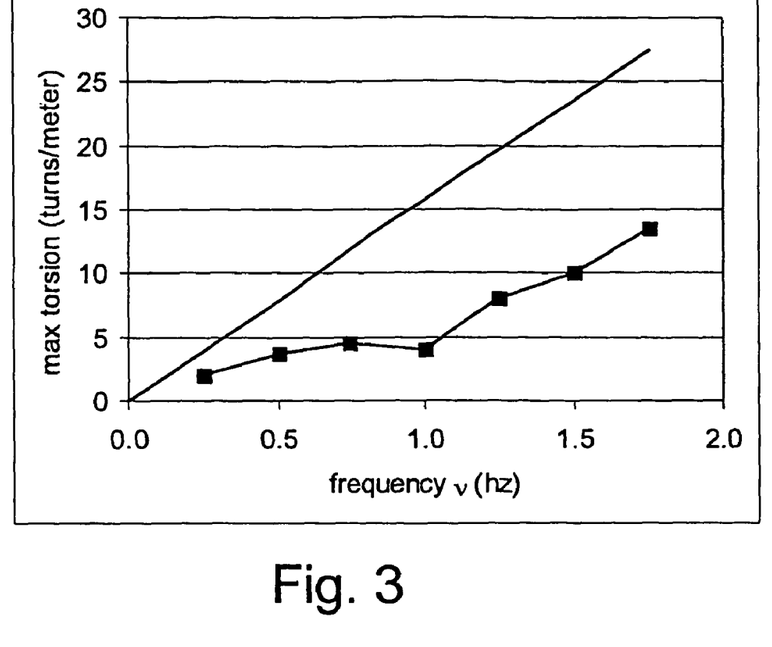
FIG. 3 shows the maximum applied torsion (as continuous straight line) and the experimental results for the maximum frozen-in torsion (as black squares) versus the spin frequency ν, obtained with a sinusoidal spin function having amplitude of 5 turns and a drawing speed of 2 m/s.

The experimental results achieved for the maximum frozen-in torsion versus the spin frequency ν are shown in FIG. 3 as black squares while the maximum applied torsion versus the spin frequency ν (given by equation 3) is shown in FIG. 3 as continuous straight line.

In the same experiment, the signal of diameter detector 14 was suitably processed, according to the teaching of WO 0133184 (or of F. Cocchini et al. "On-line fiber spinning monitoring for low PMD optical fibers" 49th IWCS proceedings (2000)), to obtain both a power spectrum of that signal and a value indicating the imparted torsion. The power spectrum turned out to be stable during spinning and the torsion actually imparted to the fiber turned out to be in agreement with the applied torsion. It was thus deduced that there were not mechanical effects, e.g. slippage, at the interface between the optical fiber and the spinning apparatus. Therefore, the applied torsion was entirely transferred to the fiber (i.e., the applied torsion was substantially the same as the actually applied torsion).

Notwithstanding the absence of said mechanical effects, a marked difference between the applied torsion and the frozen-in torsion is evident from FIG. 3. More in particular, the difference between the applied torsion and the frozen-in torsion is very small at low frequency ν values while increases with increasing frequency ν values, with a difference maximum at about 1 Hz.

Figure 4:
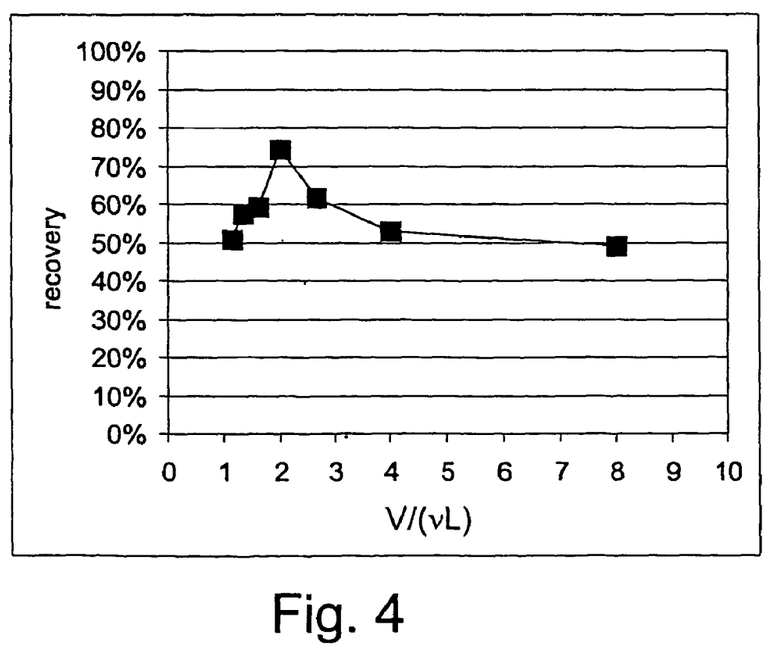
FIG. 4 shows the recovery corresponding to the results of FIG. 3 versus the ratio V/(νL)

FIG. 4 shows the recovery (as defined above in the description) extrapolated from the results of FIG. 3, versus the ratio V/(νL).

As evident from FIG. 4, the recovery is equal to or higher than 50% for about $1.2 \leq V/(\nu L) \leq 6.7$. Furthermore, the recovery is equal to or higher than 60% for $1.7 \leq V/(\nu L) \leq 3.3$.

When such relationship among ν, V and L is met, the advancing fiber—while being in the viscous state along the furnace 6—experiences both a torsion and at least a 50% (or 60%) detorsion whereby the applied torsion is partially removed by the detorsion and the resulting frozen-in spin turns out to be much lower than the applied one.

In a second experiment, the Applicant drew a glass preform by using a drawing tower like that shown in FIG. 1. The process parameters were the same of the first experiment.

Several km's of fiber were drawn either without spinning (as a comparative example) or spun at 0.5, 1 and 1.5 Hz. PMD was measured on 1 Km fiber lengths wound at zero tension with a wavelength scanning technique. The results are shown in Table 1.

| Condition | PMD ps/Km$^{1/2}$ |
|---|---|
| Unspun | 0.133 |
| Unspun | 0.226 |
| ν = 0.5 Hz – V/(νL) = 4 | 0.050 |

-continued

| Condition | PMD ps/Km$^{1/2}$ |
|---|---|
| ν = 1.0 Hz – V/(νL) = 2 | 0.059 |
| ν = 1.5 Hz – V/(νL) = 1.33 | 0.054 |

A significant PMD reduction was achieved for all the three spun samples, with respect to the unspun reference samples, notwithstanding the marked difference obtained between the applied torsion and the frozen-in torsion (see FIGS. 3 and 4).

In a third experiment, the Applicant drew a glass preform by using a drawing tower like that shown in FIG. 1. The process parameters were the same of the first experiment except for the spin function frequency ν which was set to values ranging from 3 to 8 Hz and the drawing speed V which was 12 m/s (that is, the ratio V/(νL) was comprised between 1.5 and 4). The spin function frequency, the viscous zone length and the drawing speed were such that each optical fiber length—while being in the viscous state along the furnace 6—experienced both a torsion and at least a 50% detorsion.

Several km's of fiber were drawn either without spinning, as comparative examples, or spun. PMD was measured on 1 Km fiber lengths wound at zero tension with a wavelength scanning technique.

In this experiment, the frozen-in spin resulted to be always below 4 turns/meter. Furthermore, the PMD values for spun fibers at 3 and 4 Hz were found to be always below 0.1 ps/Km$^{1/2}$ while the average PMD values for unspun fibers were found to be not less than 0.15 ps/Km$^{1/2}$.

Therefore, thanks to the method of the invention, PMD was significantly reduced even with frozen-in spin values below 4 turns/meter.

The Applicant carried out numerical simulations in order to calculate the frozen-in spin in case of an applied sinusoidal spin function. According to the model used by the Applicant, a constant torque, M, applied to the fiber produces an angular speed, ω, as a function of z, according to the following relationship $$M = \frac{\pi}{2} R^4 \mu \frac{\partial \omega}{\partial z} \qquad (4)$$

The viscous zone of the fiber wherein an appreciable viscous change of ω can be found is modeled as a barrel of constant radius R, which moves along z at constant speed (drawing speed V). The barrel has a purely viscous behaviour when 0<z<L (having viscosity μ and density ρ), and an elastic (rigid) behaviour for z>L. The barrel is constrained at z=0 to prevent axial rotation, while the elastic part is rotated at angular speed Ω.

The equation governing the dependence of the angular speed ω(z) is obtained by equating the rate of torque variation along z to the rate of kinetic moment variation with time. The torque is given by Eq. (4). To account for the overall motion along z, rate variation with time contain also the convective term V∂/∂z. Therefore, for the viscous part (0<z<L) the following relationship is achieved:

$$\frac{\partial^2 (\omega/\Omega)}{\partial (z/L)^2} = k\left(\frac{\partial (\omega/\Omega)}{\partial (tV/L)} + \frac{\partial (\omega/\Omega)}{\partial (z/L)}\right) \qquad (5)$$

with the boundary conditions, $\omega=0$ at $z=0$ and $\omega=\Omega$ at $z=L$ and with the adimensional parameter k equal to the ratio $\rho VL/\mu$, wherein $\rho$ is the density of the fiber material and $\mu$ is the viscosity of the fiber material in the viscous zone. The viscosity $\mu$ depends on the heating temperature used in the furnace.

In the case of constant $\Omega$ (corresponding to $k=\infty$), the time derivatives vanish and the following angular speed evolution along z and angle $\phi$ along z are get:

$$\frac{\omega}{\Omega} = \frac{\text{Exp}(kz/L)-1}{\text{Exp}(k)-1} \quad (6)$$

$$\frac{\phi V}{\Omega L} = \frac{1-\text{Exp}(kz/L)+kz/L}{k[1-\text{Exp}(k)]}. \quad (7)$$

The frozen-in torsion T (turns/meter) is the z-derivative of angle $\phi$, at $z=L$. Such a derivative on the left side of eq. 7 turns out to be always $1/L$. Therefore, in case of constant $\Omega$, $T=\Omega/V$.

In the case of alternating spinning, (i.e., in the case of $\Omega(t)=2\pi\nu\theta(t)$ and $\theta(t)$ given from Eq. (1)), an analytical solution can obtained for the frozen-in torsion T by using, for example, the software package sold by Wolfram Research, Inc. (Champaign, Ill.) under the MATHEMATICA trademark.

Figure 5:
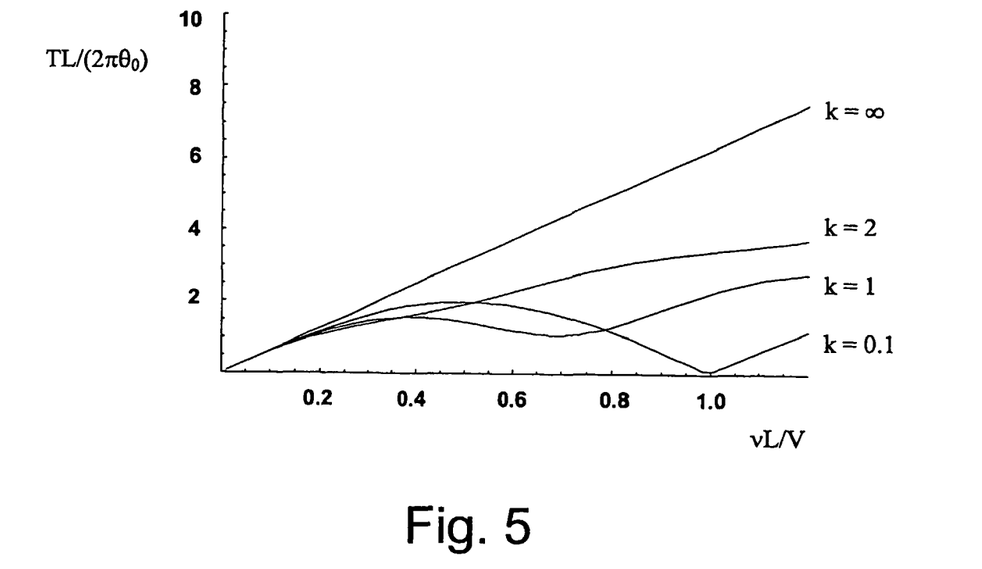
FIG. 5 shows the frozen-in spin T (normalized to $2\pi\theta_0/L$) versus the spin function frequency ν (normalized to V/L), at various k values (wherein k is defined afterwards in the description), as obtained by numerical simulations.

FIG. 5 shows the results thus achieved for the maximum frozen-in spin T (normalized to $2\pi\theta_0/L$) as a function of frequency $\nu$ (normalized to $V/L$), at various k values. A constant spin function amplitude $\theta_0$ was assumed.

In FIG. 5, for $k=\infty$, corresponding to the case in which the viscosity $\mu$ is equal to zero, the maximum frozen-in spin is equal to the maximum applied spin (straight line given by the above mentioned equation 3). The lines for $k<\infty$ corroborate the experimental results of FIG. 2. In fact, they show that the difference between the applied torsion and the frozen-in torsion is substantially null for small $\nu L/V$ values while increases with increasing $\nu L/V$ values, with a difference maximum at a certain $\nu L/V$ value. For example, for $k=1$ there is a difference maximum at $\nu L/V$ equal to about 0.7. For $k=0.1$, a 100% recovery is achieved when the spin spatial frequency $V/\nu$ is equal to L, that is when each optical fiber portion experiences a full clockwise and a full counterclockwise torsion (a torsion and a 100% detorsion) while being in the viscous status. The line for $k=1$ is the one which better describes the pattern of the experimental results of FIG. 2.

Figure 6:
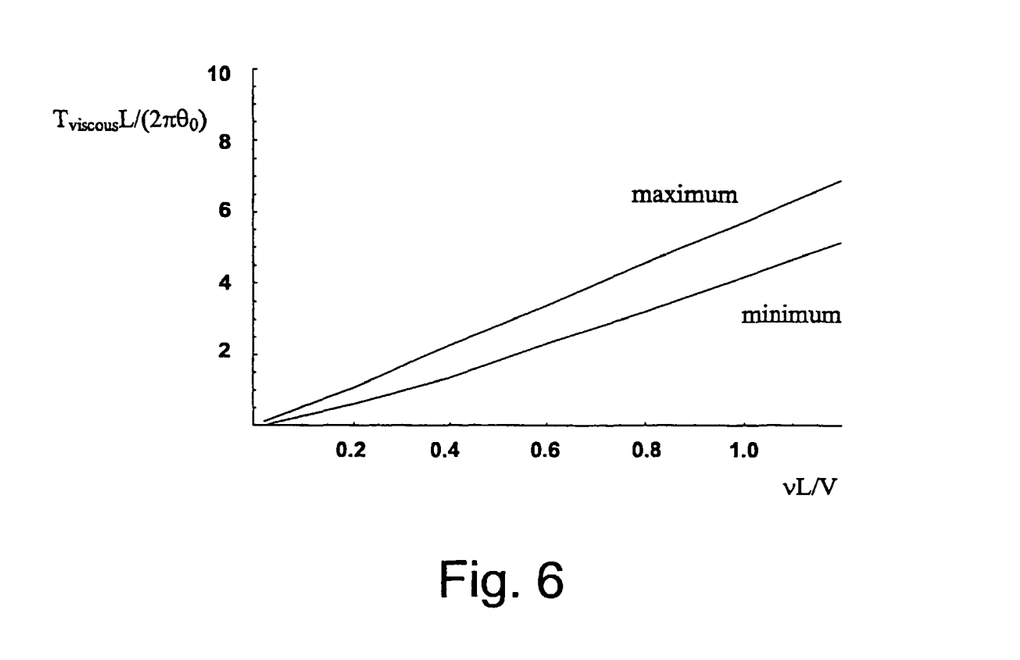
FIG. 6 shows the values of the maximum and minimum overall amount of viscous spin experienced by a small volume of glass traveling in a furnace in the case of k=2, as obtained by numerical simulations.

By means of the same model, numerical simulations were carried out by the Applicant in order to derive the overall amount of viscous spin experienced by a small volume of glass travelling in a furnace and having viscous behaviour for $0<z<L$, defined as $$T_{viscous}(t_0) = \int_{t_0}^{t_0+L/V} \left|\frac{\partial \omega(z,t)}{\partial z}\right|_{z=V(t-t_0)} dt$$

where $\omega$ is the angular speed, $t_0$ is the time at which the small volume of glass enters the viscous zone at $z=0$ and the absolute value was used due to the fact that the viscous rotation acts on the fiber geometrical asymmetries irrespectively with the clockwise or counterclockwise direction. The values of the maximum and minimum overall amount of viscous spin (which occur at specific value of $t_0$, i.e. at specific values of the phase between the travelling time in the viscous zone and the spinning function) versus the ratio $\nu L/V$ are reported in FIG. 6, in the case of $k=2$.

The Applicant has also verified that the spinning technique of the present invention causes a reduction of the cladding ovality. This change of the cladding ovality reflects changes occurring in the core ovality as well, which affect the local birefringence of the fiber. Since the principal axes of the cladding ovality do not necessarily coincides with those of the core ovality, these changes are not always congruent.

Moreover, the Applicant notes that, as shown in FIG. 6, each optical fiber portion experiences an overall viscous spin which may range from a maximum to a minimum value. Therefore, the various optical fiber portions experience different cladding ovality reductions.

This latter fact, together with the occurrence of a random relationship between the cladding and the core ovality, produces a spread of the birefringence intensity along the entire optical fiber. That is, different optical fiber portions will have different beat length values. According to the Applicant, such beat length variations along the spun optical fiber, with respect to the unspun optical fiber, allow the mixing between the two orthogonal polarization modes to be greatly increased (and, thus, the PMD to be reduced) also in fibers having (as unspun) a great number of beat lengths, even in the case of a simple sinusoidal spin function.

The Applicant notes that in the spinning techniques disclosed by the prior art, the spin function frequency, the viscous zone length and the drawing speed are such that there is a substantially one-to-one correspondence between the actually applied spin and the frozen-in spin. Accordingly, in the prior art techniques the PMD reduction is mainly due to the frozen-in spin, i.e. to the rotation of the birefringence axes permanently impressed on the fiber.

On the contrary, according to the invention, the spin function frequency, the viscous zone length and the drawing speed are such that each optical fiber portion experiences along the viscous zone both a torsion and at least a 50% detorsion. In this way, the applied torsion is partially removed by the applied detorsion and the resulting frozen-in spin is much lower than the applied one. Thus, according to the invention, a significant PMD reduction is achieved mainly thanks to the effect of the viscous spin experienced by each optical fiber portion while passing through the furnace. In fact, as stated above, the viscous spin is believed by the Applicant to reduce the fiber core asymmetry and to spread the birefringence intensity along the entire optical fiber.

An optical fiber as obtainable by the manufacturing method of the present invention may be cabled for use in optical communication systems. Therefore, an optical cable comprising at least one optical fiber according to the present invention may be produced.

The invention claimed is:

1. A method for producing an optical fiber having low polarization mode dispersion, comprising the steps of
    a) providing an optical fiber preform of glass material;
    b) heating the glass material of an end portion of the optical fiber preform in a furnace;
    c) drawing the heated glass material at a drawing speed V to form an optical fiber, each portion of the drawn glass material having a viscous zone when passing through the furnace, the viscous zone having a viscous zone length L; and
    d) applying to the optical fiber a substantially sinusoidal spin, which is transmitted to the viscous zone;
characterized in that the spin function frequency $\nu$, the viscous zone length L and the drawing speed V being such that both a torsion and at least a 50% detorsion are applied to the viscous zone of each portion of the drawn glass material, and a recovery of at least 50% occurs in the optical fiber.

2. The method according to claim 1, wherein the spin function frequency ν, the viscous zone length L and the drawing speed V are such that $1.2*L \leq V/\nu \leq 6.7*L$.

3. The method according to claim 1, wherein the spin function frequency ν, the viscous zone length L and the drawing speed V are such that both a torsion and at least a 60% detorsion are applied to the viscous zone of each portion of the drawn glass material.

4. The method according to claim 3, wherein the spin function frequency ν, the viscous zone length L and the drawing speed V are such that $1.7*L \leq V/\nu \leq 3.3*L$.

5. The method according to claim 1, wherein the spin function frequency ν, spin function amplitude $\theta_0$ and the drawing speed V are such that the maximum applied torsion is at least of 4 turns/meter.

6. The method according to claim 1, wherein the spin function frequency ν, the spin function amplitude $\theta_0$ and the drawing speed V are such that the maximum frozen-in torsion is no more than 4 turns/meter.

7. The method according to claim 6, wherein the spin function amplitude $\theta_0$ (in turns) is such that $(2V)/(\nu\pi) \leq \theta_0 \leq (2V)/[\nu\pi(1-R)]$, wherein V is the drawing speed (in meters/second), ν is the spin function frequency (in Hz), R is the ratio $(T_{appl} - T_{fr})/T_{appl}$, $T_{appl}$ is the maximum actually applied torsion and $T_{fr}$ is the maximum frozen-in torsion.

* * * * *